May 6, 1958        E. C. ZIMMERMAN        2,833,590
WINDSHIELD ARRANGEMENT
Filed Dec. 1, 1955        2 Sheets-Sheet 1
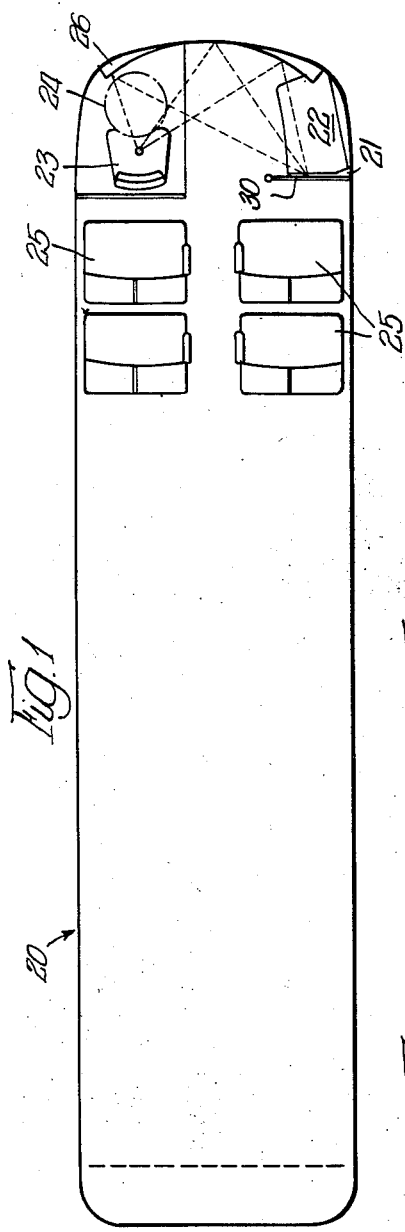
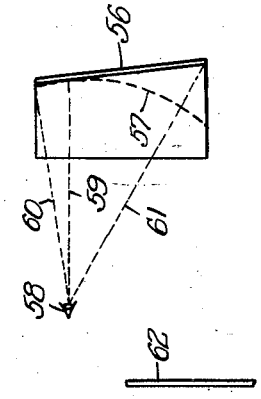
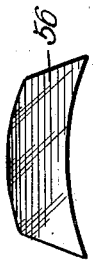
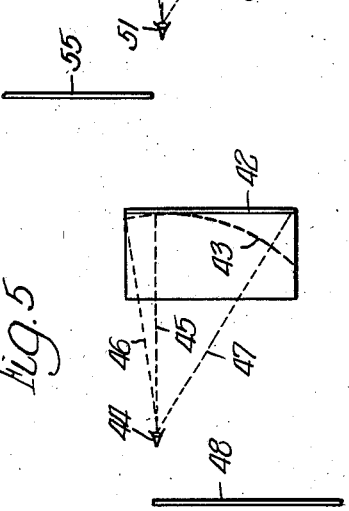
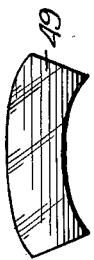
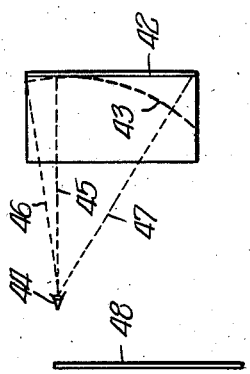
INVENTOR.
Edward C. Zimmerman,
BY
Cromwell, Greist & Warden May 6, 1958 E. C. ZIMMERMAN 2,833,590
WINDSHIELD ARRANGEMENT
Filed Dec. 1, 1955 2 Sheets-Sheet 2
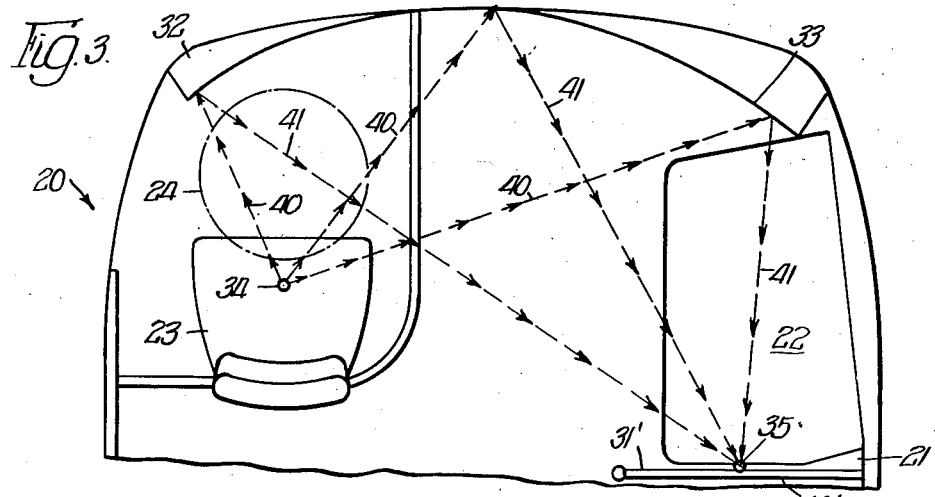
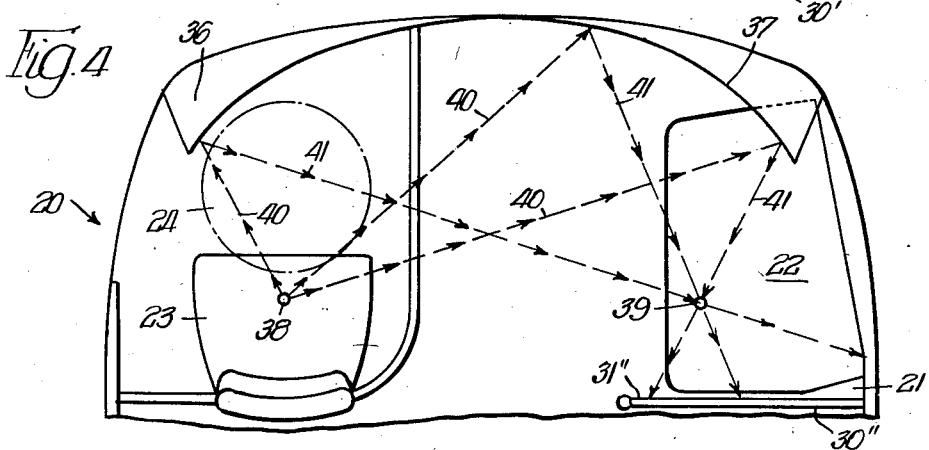
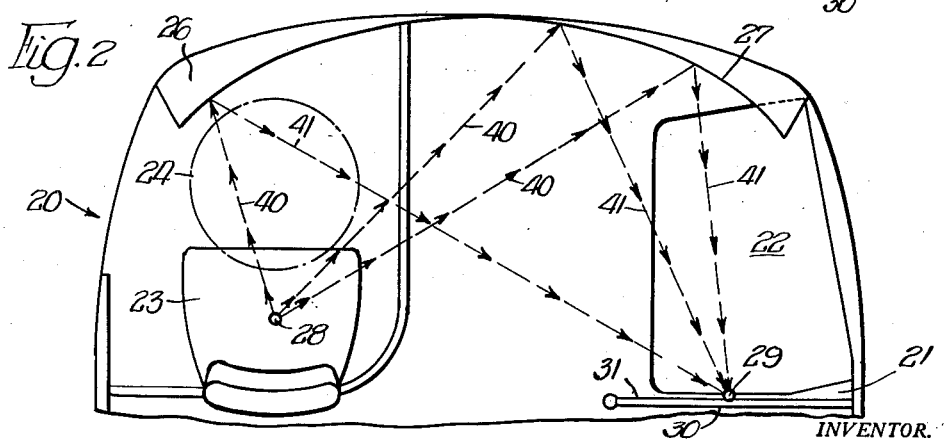
INVENTOR.
Edward C. Zimmerman
BY
Cromwell, Greist + Warden
Attys

United States Patent Office 2,833,590
Patented May 6, 1958

2,833,590

WINDSHIELD ARRANGEMENT

Edward C. Zimmerman, Chicago, Ill., assignor to Patent License Corporation, Chicago, Ill., a corporation of Illinois Application December 1, 1955, Serial No. 550,429

8 Claims. (Cl. 296—84)

The present invention relates generally to a new and improved windshield arrangement particularly adapted for use in operator driven vehicles, particularly passenger carrying vehicles such as motor coaches and streetcars which are equipped with interior lighting systems. More specifically, the present invention is directed to the provision of a new and improved windshield arrangement which includes a windshield geometrically designed to cooperate with a non-reflective means to at least substantially eliminate reflective interference with the operator's line of vision of images illuminated by the light rays of the internal lighting system of the vehicle.

In present day passenger carrying vehicles sectional windshields are commonly used which extend at least substantially across the full width of the front of the vehicle. In line with modern designs the vehicle windshield is normally formed from two separated sheets of generally flat glass. The full width windshield provides the operator of the vehicle with a wide range of vision thereby allowing the vehicle to be operated with a greater degree of safety. With the use of the full width windshield the difficulties accompanying night driving are increased due to the large area of the windshield acting as a reflective surface with respect to the lighting system used in the interior of the vehicle. The sources of light within the vehicle contact the windshield so as to cause a reflection of images of various objects within the vehicle on the inner surface of the windshield. The reflection of these images interferes with the clearness of observation from the operator's seat and tends to promote a blinding or distracting effect in the operator's line of vision. This is particularly true when the vehicle is operated in dark areas such as residential areas or country roads. Under such circumstances the advantages accompanying the use of a full width windshield are greatly reduced due to the increase in reflective area.

Efforts have been made to overcome this particular problem and such efforts have included, for example, the use of a dark curtain placed directly behind the driver's seat. This form of protective measure will aid the operator by cutting down the reflections on that portion of the windshield immediately in front of the driver. However, the remaining portion of the windshield is unprotected and the illumination from the interior of the vehicle casts images upon the unprotected portion and in effect materially reduces the advantageous use of this portion of the windshield by the operator.

Operators of passenger carrying vehicles which travel through dark country areas have resorted to the necessity of reducing the amount of interior illumination within the vehicle while retaining illumination of a degree adequate to satisfy safety regulations. As a result passengers are unable to read and a principal means of reducing the tedium of long trips is unavailable for use. To overcome this problem vehicle manufacturers have gone to great expense to install personal reading lights which direct a restricted beam of light in a limited area so as to not interfere with the operator's vision. Such installations are expensive not only with respect to original cost but also from the standpoint of maintenance.

It is an object of the present invention to provide a transparent viewing arrangement including a full width windshield of a special geometrical design which cooperates with the operator's line of vision and a non-reflective means to at least substantially eliminate reflection of the vehicle internal lighting system capable of interfering with the operator's line of vision.

Another object is to provide a windshield arrangement which incorporates the use of a full width windshield of elliptical curvature and non-reflective panel positioned within the vehicle at a point spaced from the windshield so as to not interfere with the operation of the vehicle, which windshield and panel when geometrically aligned with the point of origination of an observer's line of sight, such as the operator's line of sight, at least substantially eliminates the reflection of illuminated images and thereby provides full unimpeded use of the windshield during operation at night while further allowing complete interior illumination of the vehicle for passenger comfort and safety.

Still another object is to provide a windshield arrangement which makes use of a full width one-piece windshield at least being horizontally elliptically curved thereby defining spaced theoretical focal points, one of which is located in close proximity to the operator's seat so as to originate his line of vision from that point, and the other of which is associated with a non-reflective surface in such a manner as to eliminate the reflection of illuminated images by the windshield in the operator's line of vision.

Another object is the provision of a windshield arrangement incorporating the general principles set forth above while retaining a wide degree of freeness of design to allow the manufacture of passenger carrying vehicles to conform with the latest streamlining and modern design techniques while substantially reducing reflection caused by vehicle interior illuminating systems to allow the operator of the vehicle to substantially fully utilize the broad vision aspects of a full width windshield under night driving conditions while maintaining full interior illumination for passenger comfort and safety.

Other objects not specifically set forth will become apparent from the following detailed description made in connection with the drawings wherein:

Fig. 1 is a schematic plan view of a motor coach illustrating the relationship of the various elements making up the windshield arrangement as well as partially illustrating a conventional form of seating arrangement normally present in existing motor coaches;

Fig. 2 is a schematic fragmentary plan view on a larger scale illustrating the relationship of the various elements forming the windshield arrangement in their operative positions within a conventional motor coach;

Figs. 3 and 4 are schematic plan views similar to Fig. 2 of modified arrangements;

Fig. 5 is a side elevational schematic showing of the relationship of the various elements making up the windshield arrangement illustrating a form of windshield shown in vertical section which may be used;

Fig. 6 is a front elevation of the type of windshield illustrated in Fig. 5;

Figs. 7 and 9 are side elevational schematic showings similar to Fig. 5 illustrating modified forms of windshields; and Figs. 8 and 10 are front elevations of the forms of windshields illustrated in Figs. 7 and 9, respectively.

Curved windshields in present use have been designed, as far as the type of curvature applied thereto is concerned, without consideration being given to the type of reflection brought about by the inner or concave surfaces thereof. As presently manufactured the curved windshields reflect images which are confused and imperfect due to the curvature applied to the windshield. The light rays issuing from a point source on an axis of the curve defined by the windshield do not reflectively meet at a common focus as the rays reflected from the outer portions of the concave windshield cross the axis nearer to the windshield than those reflected from the central portion. This condition results in confused reflection which cannot be readily controlled or eliminated.

The present invention avoids confused reflection by designing the windshield to conform closely to a curvature which provides a reflecting inner surface of such shape that the light rays from a definite point will be brought to a common focus. In order to bring this about the windshield of the present invention is formed to at least substantially define an elliptical curve which, by definition, is the locus of a point the sum of whose distances from the two fixed points (foci) is constant. By providing the windshield with a curvature at least substantially following the curvature of an elliptic curve, two theoretical focal points may be determined and used in such a manner as to substantially eliminate if not completely eliminate reflection from the concave inner surface of a full width windshield of light produced by an interior lighting system. While true ellipticalness is preferred with respect to at least the horizontally extending axis of the windshield it has been found that a deviation from true ellipticalness resulting in ellipticity is permissible to allow greater flexibility in design of the windshield while at the same time substantially retaining all of the advantages arising from true ellipticalness.

The advantages of using a windshield having an elliptical curvature resides in the fact that the coordinants of the horizontally extending curve defined by the windshield may be expressed by elliptic functions. As a result the two focal points may be at least substantially determined as to their location and one aligned with the point of origination of the operator's line of vision and the other with a non-reflective panel or surface. By this arrangement the operator's line of vision is not interrupted by reflected images inasmuch as the reflective line of sight of an elliptical surface passes through both of the focal points and because of the association of the non-reflective surface with the other focal point no image is reflected by the windshield. In effect it is the non-reflective surface which is reflected by the windshield. Therefore, it is necessary merely that the non-reflective surface be of sufficient area to cover at least substantially all reflected lines of sight to materially reduce if not completely eliminate glare. For this purpose the non-reflective surface is black.

In Figs. 1–4 the above described arrangement is schematically set forth. As illustrated in these figures a motor coach 20 is shown as including a doorway opening 21 along one side thereof near the front portion thereof. The doorway is of conventional design having a stair well 22 associated therewith. Opposite the doorway 21 near the other side of the vehicle 20 is an operator's seat 23 closely associated with a steering wheel 24. The arrangement of the elements described is conventional as found in motor coaches now in use. As illustrated in Fig. 1 directly behind the driver's seat 23 and the doorway 21 are a number of spaced passenger seats 25.

The upper front portion of the vehicle 20 is provided with a windshield 26 which extends substantially the full width thereof. The height of the windshield may of course vary considerably. The windshields illustrated in the drawings are each formed to define an elliptical curve which in accordance with the accepted definition of an elliptical curve is the locus of a point the sum of whose distances from two fixed focal points is constant. Referring particularly to Fig. 2 the focal points defining the curve 27 are designated by the numerals 28 and 29. The focal point 28 is situated with respect to the operator's seat 23 so as to be closely associated with the operator's eyes. The remaining focal point 29 is aligned with a vertical panel 30 which is provided with a front surface 31 which is made at least substantially non-reflective as, for example, by being painted black or otherwise covered with black non-reflective material. The focal points 28 and 29 may be readily aligned in the manner described by governing the curvature of the windshield 26.

Variations of the above described arrangement are illustrated in Figs. 3 and 4, where the focal points of the curves defined by the windshields are relocated. For example, the windshield 32 of Fig. 3 defines a curve 33 which in turn is defined by focal points 34 and 35. The focal point 34 is aligned with the point of origin of the operator's line of vision while the focal point 35 is aligned with the front surface of a panel 30'. However, as can be seen in comparing Fig. 3 with Fig. 2, the panel 30' is located a greater distance from the windshield 32 than the panel 30 of Fig. 2 is positioned with respect to the windshield 26. This arrangement allows for a modification in design as to the location of the doorway 21 or the width thereof while still retaining the advantages of a non-glare windshield arrangement. To bring this about the curve 33 is slightly different from the curve 27 and as a result the focal points 34 and 35 are relocated as compared with the focal points 28 and 29.

The arrangement of Fig. 4 illustrates a further modification of the use of an elliptical curvature in designing a windshield. In this instance the windshield 36 is formed with a curvature designated by the line 37 which in turn is defined by focal points 38 and 39, the former being located with respect to the operator's seat 23 so as to be closely associated with the origin of the operator's line of sight while the latter is closely associated with a panel 30" while not being aligned directly with the non-reflective front surface 31" thereof. The non-reflective result is substantially retained by the arrangement although all reflective lines of sight do not take in the panel 30". As long as the panel 30" is of sufficient area to be in the reflective line of sight in most instances, reflection is materially reduced.

In each of Figs. 1–4 the operator's lines of sight are diagrammatically illustrated by the broken lines 40 which are directed from the focal points 28, 34 and 38. In each instance, assuming that the interior of the vehicle 20 is well illuminated, the operator's lines of sight may be directed in any direction toward the windshield and due to the reflective properties of the elliptical curves incorporated in the design of the various windshields the reflection of images normally caused by interior illumination is eliminated by the reflective lines of sight 41 being aligned in at least close proximity with the non-refletcive surfaces 31, 31', and 31". As a result, few if any lighted objects are reflected by the inner surface of the windshield with respect to the operator's line of vision and his line of vision through the windshield is not interrupted or interfered with.

The lines 27, 33 and 37 in Figs. 2–4 respectively, illustrate the horizontally extending curvature of the windshields. This curvature is of primary importance as it is the horizontally extending curvature on which the non-reflective properties of the arrangement primarily rely. With respect to the vertical plane defined by the various forms of windshields suitable for use in the arrangement disclosed, reference is now made to Figs. 5–10. As the vertical curvature is of less importance with respect to obtaining non-reflective properties it has been found possible to design the windshields suitable for use in the arrangement of the present invention to conform with existing designs insofar as the vertical curvature of the windshield is concerned. For example, in Fig. 5 a windhield 42 is illustrated as being upright and vertically flat. For comparison purposes the broken line 43 represents the vertical curvature of a true ellipsoid and is depicted with the straight line vertical design of the windshield 42 to illustrate the relatively slight deviation existing between the windshield 42 in its vertical direction and a true elliptical function. As illustrated by the diagrammatically shown eye 44, which designates the origin of the operator's lines of vision, the lines of sight would principally be directed along the horizontal line 45. The line of vision designated by the line 45 contacts the windshield 42 at a point which coincides with the elliptical curve 43 thereby resulting in a true elliptical reflective function for this particular line of sight along the entire horizontal length of the windshield 42. The additional lines of sight, such as those designated by the lines 46 and 47, which do not contact the windshield at truly elliptical portions may nevertheless be reflectively covered by a non-reflective panel 48 providing the panel is of adequate height and is properly located. The horizontally extending elliptical curvature of the windshield will define the horizontal positioning of the panel while the vertical curvature of the windshield will define the vertical positioning of the panel. Where the windshield is merely horizontally elliptical, the reflective focal point will be on a vertical line which is the locus of a number of focal points, the horizontal positioning of the line being determined by the horizontally extending curvature of the windshield and the extent of the line in a vertical direction being determined by the height of the windshield. Under such circumstances it is necessary merely to properly position a panel of adequate height capable of covering all reflective lines of sight as viewed from the operator's seat. In Fig. 5, the windshield 42 being vertical, the panel 48 must be relatively high to properly cover the reflective lines of sight.

The front elevation of the windshield 42, as shown in Fig. 6, illustrates the general shape of the vertical type of windshield which may be used in the arrangement of the present invention.

In order to further conform with various existing windshield designs it is possible to utilize the principles of the present invention in a windshield which, with respect to its vertical axis, is tilted forwardly as illustrated by the windshield 49 in Fig. 7. Here again the relationship of the vertical curvature of the windshield 49 is shown with respect to the outline of an ellipsoid represented by the broken line 50. As described in connection with Fig. 5 the line of sight represented by the diagrammatic showing of an eye 51 normally follows the general direction of the line 52 extending upwardly as illustrated by the line 53 and downwardly as illustrated by the line 54. However, the main observations are made within the general vicinity of the line 52 and at this point on the windshield 49 it can be seen that the curvature of a true ellipsoid is substantially tangential to the windshield 49.

As illustrated in Fig. 8 the windshield 49 is designed with a horizontally extending curvature which conforms to an elliptical curve while the vertical axis of the windshield is tilted forwardly. As a result of this arrangement the windshield 49 is in fact designed from a section of an elliptical based cone which conforms with the outer curvature of an ellipsoid in a horizontal direction and which is tangential to the outer curvature of an ellipsoid in a vertical direction. In making use of the forwardly tilted windshield 49 it is necessary to suspend the non-reflective panel 55 in an overhead position to thereby align the non-reflective surface of the panel 55 with the reflective lines of sight. If the panel 55 is of sufficient vertical length the line defining the locus of the focal points of the reflective lines of sight will be properly covered. As is readily apparent the panel may be suspended from the ceiling of a conventional motor coach in its same general location with respect to the doorway 21 illustrated in Figs. 1–4.

Figs. 9 and 10 illustrate still a further design of a non-reflective windshield 56 which in a vertical direction is tilted rearwardly to conform with existing windshield designs. As illustrated in Fig. 10 the horizontally extending curvature of the windshield 56 defines a true elliptical function and the design of the windshield 56 is derived from sectioning an elliptical based cone, the section removed conforming along its horizontal axis with the curvature of an ellipsoid while the vertical axis thereof exhibiting a tangential relationship with the curvature of an ellipsoid throughout a substantial portion thereof. The tangential relationship is illustrated in Fig. 9 with respect to the broken line 57 which illustrates the portion of the ellipsoidal curve from which the section of the elliptical based cone is taken to define the curvature of the windshield 56. A line of sight originating from the diagrammatically shown eye 58 primarily follows the direction of the line 59 and at its point of contact with the windshield 56 substantially true ellipticalness is obtained. Additional lines of sight designated by the numerals 60 and 61 illustrate the extent of vertical variation between the operator's limits of vision. When using the rearwardly tilted type of windshield 56 shown in Fig. 9 the non-reflective panel 62 is placed in a lowered position so as to adequately cover all reflective lines of sight. As a result an additional advantage is derived from this arrangement as the vertical height of the panel 62 may thereby be materially reduced and when such a panel is placed in its operative position, as shown in Figs. 1–4, a passenger seated directly behind the panel is not inconvenienced by having his forwardly directed line of vision reduced by the height of the panel 62.

From the description of Figs. 5–10 it should be readily apparent that the windshield used in the non-reflective viewing arrangement of the present invention may vary considerably in design. While these figures illustrate vertically flat windshields in conformance with the design of the majority of present day windshields, it should nevertheless be understood that it is within the purview of the present invention to make use of windshields which are truly elliptical with respect to both their horizontal and vertical axes. Due to the expense involved in manufacturing such windshields it will normally be considered adequate to utilize a windshield which is provided with a horizontally extending elliptical curvature and a straight line vertical curvature. However, from the description set forth above the use of a single plane windshield with respect to its vertical axis does not in any way materially decrease the non-reflective properties of the arrangement described and such windshields have been found to be entirely satisfactory in use.

In following the general teachings of the present invention it is further contemplated that windshields may be designed so as to not truly define in a horizontally extending direction an elliptical function while at the same time substantially defining an elliptical function of an extent that the non-reflective surface used in conjunction with the windshield is effective in substantially reducing the reflection of interior illumination. As described in connection with the vertical curvature, or lack of curvature, of a windshield suitable for use in the non-reflective arrangement of the present invention, the curvature of the horizontally extending axis of the windshield may deviate from a true elliptic function while at the same time exhibiting sufficient ellipticity to adequately function with a non-reflective surface to present a substantially non-reflective arrangement.

By referring to a non-reflective surface it is to be understood that any surface having subdued reflective properties may be used, it being recognized that no known surface is completely incapable of reflection.

Obviously many modifications and variations of the

I claim:

1. A windshield arrangement including a windshield the inner surface of which is provided with an elliptical curvature, means for originating an observer's line of sight through said windshield and inwardly thereof at one of the focal points of said elliptical curvature, and reflection eliminating means in spaced relation to said first named means inwardly of said windshield, said reflection eliminating means including a non-reflective surface substantially aligned with the reflective line of sight established by said windshield originating from said first named means.

2. A windshield arrangement including a windshield the inner surface of which is provided with a horizontally extending elliptical curvature, means for originating an observer's line of sight through said windshield and inwardly thereof at one of the focal points of said elliptical curvature, and reflection eliminating means in spaced relation to said first named means inwardly of said windshield, said reflection eliminating means including a non-reflective surface substantially aligned with the reflective lines of sight estabilshed by said windshield originating from said first named means.

3. A windshield arrangement including a windshield the inner surface of which is vertically flat while being provided with a horizontally extending elliptical curvature, means for originating an observer's line of sight through said windshield and inwardly thereof at one end of the focal points of said elliptical curvature, and reflection eliminating means in spaced relation to said first named means inwardly of said windshield, said reflection eliminating means including a non-reflective surface substantially aligned with the reflective lines of sight established by said windshield originating from said first named means.

4. A windshield arrangement including an elliptically curved windshield having located inwardly thereof an observer's positioning means and a reflection eliminating means in spaced relation to said observer's positioning means, said means each being located relative to one another and the inner surface of said windshield to substantially coincide with the focal points of the elliptical curvature of said windshield to substantially eliminate reflection by the inner surface of said windshield observable from said observer's positioning means.

5. A windshield arrangement including a horizontally elliptically curved windshield having located inwardly thereof an observer's positioning means and a reflection eliminating means in spaced relation to said observer's positioning means, said means each being located relative to one another and the inner surface of said windshield to substantially coincide with the spaced loci of focal points of the elliptical curvature of said windshield to substantially eliminate reflection by the inner surface of said windshield observable from said observer's positioning means.

6. A windshield arrangement including a vertically flat horizontally elliptically curved windshield having located inwardly thereof an observer's positioning means and a reflection eliminating means in spaced relation to said observer's positioning means, said means each being located relative to one another and the inner surface of said windshield to substantially coincide with the spaced loci of focal points of the elliptical curvature of said windshield to substantially eliminate reflection by the inner surface of said windshield observable from said observer's positioning means.

7. A windshield arrangement including an elliptically curved windshield having located inwardly thereof an observer's positioning means and a reflection eliminating means in spaced relation to said observer's positioning means, said reflection eliminating means being in the form of a panel provided with a black surface facing said windshield, said observer's positioning means and said reflection eliminating means each being located relative to one another and the inner surface of said windshield to substantially coincide with the focal points of the elliptical curvature of said windshield to substantially eliminate reflection by the inner surface of said windshield observable from said observer's positioning means.

8. In a passenger vehicle having a side doorway provided with a stair well opposite an operator's seat in the forward portion thereof, the provision of an elliptically curved windshield extending substantially across the front of said vehicle, and a relatively short vertical panel having a non-reflective front face mounted near the rear edge of said stair well, said seat and panel each being located relative to one another and the inner surface of said windshield to substantially coincide with the focal points of the elliptical curvature of said windshield to substantially eliminate reflection by the inner surface of said windshield observable from said seat.

References Cited in the file of this patent

UNITED STATES PATENTS

| | | |
|---|---|---|
| 2,010,656 | Bernard | Aug. 6, 1935 |
| 2,289,144 | Rossell et al. | July 7, 1942 |

FOREIGN PATENTS

| | | |
|---|---|---|
| 1,051,780 | France | Sept. 23, 1953 |
| 506,533 | Great Britain | May 30, 1939 |